United States Patent
Gagne' et al.

[11] Patent Number: 6,143,801
[45] Date of Patent: Nov. 7, 2000

[54] CATALYST FOR ESTER METATHESIS

[75] Inventors: Michel R. Gagne', Carrboro; Michael R. Korn, Durham, both of N.C.

[73] Assignee: The University of North Carolina at Chapel Hill, Chapel Hill, N.C.

[21] Appl. No.: 08/992,800

[22] Filed: Dec. 18, 1997

Related U.S. Application Data

[60] Provisional application No. 60/032,514, Dec. 20, 1996.

[51] Int. Cl.$^7$ .............................. C08J 11/04; C08K 5/49; C08G 63/78
[52] U.S. Cl. ......................... 521/48; 528/272; 528/275; 528/283; 528/286; 528/303; 528/307; 528/308; 528/308.6; 525/437; 525/444; 524/115; 524/155; 524/175; 524/186; 524/188; 524/261; 524/394; 524/706; 524/714; 524/742; 524/755; 521/40
[58] Field of Search ..................................... 528/272, 275, 528/283, 286, 303, 307, 308, 308.6; 525/437, 444; 524/115, 155, 175, 186, 188, 261, 394, 706, 714, 742, 755; 521/40, 48

[56] References Cited

U.S. PATENT DOCUMENTS

| | | | |
|---|---|---|---|
| 4,246,370 | 1/1981 | Lewis et al. | 525/131 |
| 4,334,061 | 6/1982 | Bussier, III | 536/119 |
| 5,081,224 | 1/1992 | Ando et al. | 528/354 |
| 5,124,301 | 6/1992 | Wyness et al. | 502/171 |
| 5,194,547 | 3/1993 | Ohashi et al. | 526/266 |
| 5,424,420 | 6/1995 | Hasenhuettl et al. | 536/115 |
| 5,491,226 | 2/1996 | Kenneally | 536/115 |

*Primary Examiner*—Samuel A. Acquah
*Attorney, Agent, or Firm*—Myers Bigel Sibley & Sajovec, P.A.

[57] ABSTRACT

A method of forming an esterification product Comprises providing (1) a material selected from the group consisting of ester monomers, ester oligomers, ester polymers, and mixtures thereof, and (2) a catalyst selected from the group consisting of:

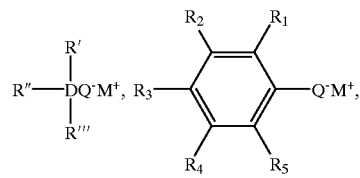

and mixtures thereof.

wherein D is selected from the group consisting of carbon and silicon; Q is selected from the group consisting of O, S, and NR; M is selected from the group consisting of sodium, lithium, potassium, rubidium, and cesium; R, $R_1$, $R_2$, $R_3$, $R_4$, $R_5$, R', R", and R'" are each independently selected from the group consisting of H, O, halogen, Si, N, S, P, $C_1$ to $C_{20}$ linear or branched alkyl, $C_3$ to $C_{10}$ cycloalkyl, and aromatic; and reacting the material in the presence of the catalyst to form an esterification product.

34 Claims, No Drawings

CATALYST FOR ESTER METATHESIS

CROSS REFERENCE TO RELATED APPLICATION

This application claims the benefit of U.S. Provisional Application No. 60/032,514, filed Dec. 20, 1996.

FIELD AND BACKGROUND OF THE INVENTION

The present invention relates to catalysts used for ester metathesis.

Esterification products, and in particular, polyesters (e.g., polyethylene terephthalate or PET, PEN, polyester oligomers, liquid crystal polyesters, and PBT), along with polycarbonates, are used in a vast array of products. Such products include, for example, cotton-blended fabrics, wool-blended fabrics, recording media, reinforced plastics, and thermoplastic elastomers. Additionally, polyesters are being increasingly used in beverage bottles.

Ester-containing materials (e.g., polymers) are often prepared commercially by a transesterification reaction involving ester monomers, oligomers, polymers, etc. and alcohols. In such a reaction, catalysts containing metals such as manganese, calcium, zinc, tin, titanium, and the like have typically been employed. These catalysts, however, suffer from several drawbacks. Rates of reaction using such materials are typically slow and thus often limit the rate of producing polyester-containing end products.

Additionally, trace amounts of the catalyst are often present in the polyester material upon completion of the reaction. Residual catalyst traces may trigger ongoing transesterification when the starting material is subjected to heat such as during processes involving extrusion, molding, and the like. This is undesirable since it potentially adversely affects physical properties of resulting end products. Accordingly, the presence of a catalyst deactivator (additive) is often required. Moreover, the presence of residual catalyst traces is highly disadvantageous when polyester is used in consumer products such as soft drink bottles, since these metals have the ability to leech into the liquid. Thus, the catalysts may be potentially hazardous from a biological standpoint.

In view of the above, it is an object of the present invention to provide for a catalyst for use in forming esterification products which provides for faster rates of reaction and is potentially more biologically acceptable than previous catalysts.

SUMMARY OF THE INVENTION

The present invention provides a method of forming an esterification product. Specifically, the method comprises providing: (1) a material selected from the group consisting of ester monomers, ester oligomers, ester polymers, and mixtures thereof, and (2) a catalyst of the formula selected from the group consisting of:

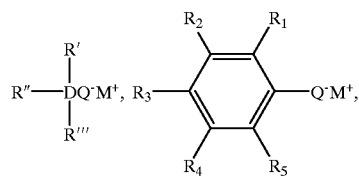

and mixtures thereof.

wherein D is selected from the group consisting of carbon and silicon; Q is selected from the group consisting of O, S, and NR. M is selected from the group consisting of sodium, lithium, potassium, rubidium, and cesium. R, $R_1$, $R_2$, $R_3$, $R_4$, $R_5$, R', R", and R'" are each independently selected from the group consisting of H, O, halogen, Si, N, S, P, $C_1$ to $C_{20}$ linear or branched alkyl, $C_3$ to $C_{10}$ cycloalkyl, and aromatic. Subsequently, the ester monomers, oligomers, polymers, or mixtures thereof are reacted in the presence of the catalyst to form an esterification product. Various esterification products may be formed including those, for example, which are linear or branched.

In one embodiment, the catalyst may be of the formula:

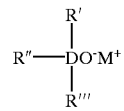

wherein R', R", and R'" may be either $C_1$ or $C_2$ alkyl.

Ester monomers are preferably selected from the group consisting of ethylene glycol diacetate, dimethylterephthalate, propylene glycol diacetate, dimethyladipate, hexanedioldiacetate, dimethylnaphthalate, bisphenol-A diacetate, diphenyl carbonate, diphenyl ester of terephthalic acid, bisphenyl ester of isophthalic acid, bisphenyl carbonate of bisphenol-A, bismethyl carbonate of bisphenol-A, and mixtures thereof.

The invention also provides a method of decomposing an esterification product. The method comprises providing an esterification product and the catalyst listed herein; and then reacting the esterification product in the presence of the catalyst to decompose the esterification product and form ester monomers, ester oligomers, ester polymers, and mixtures thereof.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The present invention relates to a method of forming an esterification product. For the purposes of the invention, the term 'esterification product' is to be broadly construed and include, but not be limited to, esters, carbonates, phosphonates, and polymers thereof. These products may include a number of optionally substituted aliphatic and/or aromatic substituents which may be functionalized. The method includes providing a material including a plurality of ester monomers, ester oligomers, ester polymers, or mixtures thereof, and catalyst selected from the group consisting of:

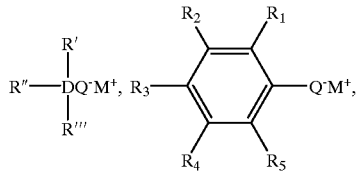

and mixtures thereof.

wherein D is selected from the group consisting of carbon and silicon; and M is selected from the group consisting of sodium, lithium, potassium, rubidium, and cesium. Q is selected from the group consisting of O, S, and NR. R, R', R", R'", $R_1$, $R_2$, $R_3$, $R_4$, and $R_5$ are each independently selected from the group consisting of H, O, halogen (e.g., Br, Cl, F, I), Si, N, S, P, $C_1$ to $C_{20}$ linear or branched alkyl, $C_3$ to $C_{10}$ cycloalkyl, and aromatic. As set forth herein, the alkyls, cycloalkyls, and aromatics may be optionally substituted. Subsequently, the ester monomers, ester oligomers, ester polymers, or mixtures thereof are reacted in the presence of the catalyst to form the esterification product.

As described above, the catalyst may contain various alkyl, cycloalkyl, and aromatic groups which may be optionally substituted. As an example, halogenated substituents such as halogenated alkyls, preferably fluoroalkyls such as fluoroalkoxides may be employed on the above alkyl, cycloalkyl, and aromatic groups. The alkyls, cycloalkyls, and aromatic groups may also contain, for example, oxygen and/or oxygen-containing groups (e.g., esters, ethers, etc); sulfur and/or sulfur-containing groups; phosphorous and/or phosphorous-containing groups; and silicon and/or silicon-containing groups. Various aryl groups may be used on the alkyl, cycloalkyl, and aromatic groups, and these aryl groups may be functionalized in a manner known to one skilled in the art. For example, aryloxides may be employed.

For the purposes of the invention, the catalyst, in one embodiment, may be of the formula:

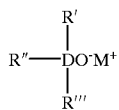

M is preferably lithium, sodium, potassium, rubidium, or cesium; and R', R", and R'" are each preferably $C_1$ or $C_2$ alkyl. The catalyst may be employed in various suitable amounts. Preferably, the amount of catalyst used ranges from about 0.001 mole percent to about 20 mole percent, and more preferably about 0.1 to about 2 mole percent. The term "catalyst" should also be interpreted to cover various mixtures of catalysts.

A wide range of ester monomers, ester oligomers, ester polymers, or mixtures thereof may be employed to form various esterification products. The above materials are preferably polyfunctional. A general formula which encompasses ester monomers which may be used in the reaction are described by the formula:

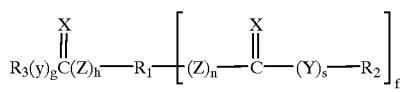

wherein $R_1$, $R_2$, and $R_3$ may be alkyl or aryl as defined herein, the alkyl and aryl chains optionally bearing heteroatom moieties such as halogen, oxygen, phosphorous, sulfur, silicon, and the like; X, y, and Z may be either oxygen or sulfur; g may be 0 or 1; h may be 0 or 1; n may be 0 or 1; s may be 0 or 1; and f may be any degree of functionality, and is preferably an integer ranging from 0 to 200.

Cyclic esters which may be used are described by the general formula:

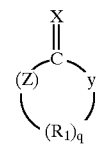

wherein $R_1$, X, y, and Z are defined herein, and q is an integer greater than or equal to 2.

Specific ester monomers which may be used include, but are not limited to, ethylene glycol diacetate, propylene glycol diacetate, dimethylterephthalate, dimethyladipate, hexanedioldiacetate, dimethylcarbonate, diphenylcarbonate, Bisphenol A acetate, Biphenol diacetate, acetoxy glycolic acid methyl ester, dimethylnaphthalate, bisphenol-A diacetate, diphenyl carbonate, diphenyl ester of terephthalic acid, bisphenyl ester of isophthalic acid, bisphenyl carbonate of bisphenol-A, bismethyl carbonate of bisphenol-A, and mixtures thereof. Lactones, cyclic polyesters, and cyclic carbonates may be also be used including, but not limited to, propiolactone, butyrolactone, valerolactone, caprolactone, glycolide, lactide, ethylene carbonate, and propylene carbonate.

The process of forming the esterification product may be carried out in the presence or absence of an organic solvent. Exemplary organic solvents include, but are not limited to, hydrocarbons such as aliphatic, aromatic, and ethereal components. Specific solvents include toluene, xylene, cyclohexane, benzene, tetrahydronaphthalene, naphthalene, anisole, chlorobenzene, diethyl ether, dibutyl ether, diphenyl ether, tetrahydrofuran, dioxane, diglyme, dichloroethane, and the like. Mixtures of any of the above may be used. When a solvent is present, a pressure ranging from about 0 to about 10,000 psig may be employed. The solvent may be employed in various amounts, typically between about 0 and about 50 percent based on the weight of the starting ester monomers.

The esterification reaction may also be carried out in a gaseous phase such as in $CO_2$, or in condensed gas or gases such as, for example, liquid or supercritical $CO_2$. The above reaction may also be carried out in a gas phase using, for example, $CO_2$. In the event a catalyst is employed, the catalyst can be fixed on a carrier support, such as one which contains $SiO_2$.

The process of the present invention may be carried out as follows. A catalyst is mixed with or without a solvent, depending on whether the ester monomers which are used are in liquid or solid form. Equilibrium is established quickly in minutes. At this time (or concurrent with the reaction), a method is employed to remove volatile by-products, typically via vacuum, and the reaction is driven to an ester product (e.g., monomer, oligomer, or polymer). If desired, the reaction may be heated.

Preferably, the step of reacting the ester monomers, ester oligomers, ester polymers, etc. is carried out at a temperature ranging from about −78° C. to about 350° C., more preferably between about 0° C. and about 300° C., and most preferably between about 0° C. and about 250° C. The reaction pressure typically ranges from about 0 psig to about 10,000 psig. Moreover, the reaction step preferably takes place between about 0.5 minutes and about 6 hours, and more preferably from about 30 minutes and about 120 minutes.

Various esterification products may be formed by the method of the present invention. A general formula describing the esterification products is given as follows:

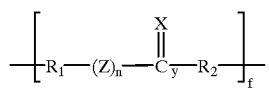

wherein $R_1$, $R_2$, X, y, Z, and n being defined herein, a p representing any degree of polymerization, preferably being an integer ranging from 1 to 200. Side chains may also be formed on the structure in the formula described above and are set forth by the formula:

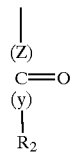

Specific examples of esterification products include, but are not limited to, polyesters (e.g., PET, PEN, and PBT), polyvinyl alkylates, poly acrylates, poly(meth)acrylates, liquid crystal polyesters, ester oligomers, polycarbonates, PMMA, polyvinylacetate, and cellulose derivatives which can be used in a wide range of applications. Such applications include, but are not limited to, fabrics including those which may contain polyester in blends (e.g., cotton and wool blends), recording media, and reinforced resins and plastics. Also, the polyesters are particularly well suited for use in beverage bottles such as those which contain soft drinks. Thioesters may also be formed. Mixtures of any of the above products may be formed, including, for example, a polyester/polycarbonate product mixture.

Esterification products also include esterified pharmaceutical materials. More specifically, the method of the invention may be used in the pharmaceutical discovery area of research, development, and manufacturing where employing solid-phase or parallel synthesis techniques are capable of generating numerous esterification products of pharmaceutical materials. This may be carried out by adding the catalyst to a mixture of esters and the pharmaceutical material to form a statistical mixture of newly esterified pharmaceutical drugs. This aspect is potentially advantageous when the emphasis is on producing pharmaceutical materials as cheaply and selectively as possible while minimizing by-product formation. The esterification products can also be used as, for example, sutures, implants, and drug carriers.

The invention also relates to a method of decomposing an esterification product (e.g., a polyester) into an ester-containing material (e.g., (ester monomers, ester oligomers, ester polymers, and mixtures thereof). In particular, the method includes providing an esterification product and a catalyst selected from the group consisting of:

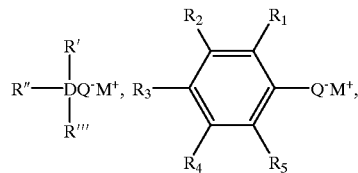

and mixtures thereof.

wherein R', R", R''', D, Q, M, $R_1$, $R_2$, $R_3$, $R_4$, and $R_5$ are defined herein. Subsequently, the esterification product is decomposed in the presence of the catalyst to form the material.

The method of forming the decomposing of the esterification product is carried out according to the following steps as described below. For example, a polyester is mixed with a low molecular weight ester, with or without solvent, and catalyst is then added. Within 0 to 60 minutes, the molecular weight of the virgin polyester is reduced. Bisphenol A polycarbonate (molecular weight Mw=52,000 g/moles), diphenylcarbonate and catalyst were then stirred in the mixture for 30 minutes, which resulted in Bisphenol A polycarbonate of significantly reduced molecular weight (Mw=4000 g/moles). A control experiment without catalyst resulted in Bisphenol A polycarbonate of Mw=52,000 g/moles, thus no change was observed.

The step of reacting the esterification product in the presence of the catalyst is preferably carried out at a temperature ranging from about −78° C. to about 300° C., and more preferably from about 0° C. to about 250° C. The decomposition step preferably is carried out at a pressure ranging from about 0 psig to about 2000 psig. The above decomposing step preferably takes place between about 1 and about 60 minutes.

A number of esterification products may be decomposed by the method of the invention. Such materials, for example, include those polyesters described herein. Additionally, potentially environmentally hazardous materials may be decomposed including, but not limited to, phosphorous-based esters, thioesters, esterified pharmaceutical material, and mixtures thereof. Exemplary materials include, for example, VX™, Sarin™, Soman™, and Tabun™.

Ligands may be employed in the methods of the invention to accelerate the rates of reaction of esterification product formation or decomposition. Such ligands include, for example, polydentate ligands like crown ethers, cryptands, and mixtures thereof.

The above ligands are employed under processing conditions known to those skilled in the art. In the method of forming an esterification product, the ligands are preferably employed in an amount ranging from about 0.001 to about 10 mole percent, and more preferably from about 0.1 to 5 about mole percent. In the method of decomposing the esterification product, the ligands are preferably employed in an amount ranging from about 0.001 to about 10 mole percent, and more preferably from about 0.1 to about 5 mole percent.

The following examples are set forth to illustrate the invention, and are not meant to be construed as a limitation thereon.

EXAMPLE 1

Synthesis of Polycarbonate 3.12 g (0.01 moles) of Bisphenol-A diacetate and 2.14 g (0.01 moles) of Diphenylcarbonate are mixed in a flask provided with a distillation arm and collecting flask. 11.2 mg (0.5 mole % ref. to ester groups) of KOtBu in 2 ml dry THF are added. The mixture is stirred with a magnetic stir bar and placed on a 180° C. oil bath. A vessel of liq. nitrogen is placed under the collecting vial for 15 min. while raising the temperature to 195° C. A high vacuum is applied for 10 min. while raising temperature to 200° C. In the end a highly viscous, brownish material is received. Afterwards the reaction is cooled down to room temperature. GPC analysis shows Mw=4900, Mn=2700, and PDI=1.80.

EXAMPLE 2

Synthesis of PET 7.8 g (0.04 moles) Dimethylterephthalate (DMT) and 2.8 g (0.02 moles) ethylene glycol diacetate are mixed in a flask equipped as in Example 1 (distillation arm, collecting flask). The mixture is stirred with a magnetic bar. 44 mg of KOtBu are then added (1 mole % ref to DMT). The vial is evacuated and placed on a 150° C. hot oil bath. After 10 min., liquid nitrogen is placed under the collecting flask for 10 min. After another 10 min., the reaction is stopped. The material is analyzed by HPLC in THF/Hexanes (30/70), showing 12 peaks in decreasing intensity with higher elution times. The major peak is identified as DMT

EXAMPLE 3

Breakdown of Polycarbonate 2.54 g of Poly(Bisphenol-A carbonate) (PC)(Mw=50000, Mn=22000, PDI=2.2) and 0.53 g of Diphenyl carbonate (21.5 molar excess over PC) are weighed in a flask, purged with argon, and dissolved in 50 ml of dry THF. 9 mg KOtBu in dry THF are then added. After 2 min., at room temperature a sample was collected. GPC results show Mw=4300, Mn=2800, PDI=1.5. After 60 min. the material was precipitated into methanol, filtered, washed with methanol and dried under high vacuum at room temperature. GPC results show Mw=4400, Mn=2900, PDI=1.5.

In the specification and examples, there have been disclosed typical preferred embodiments of the invention and, although specific terms are employed, they are used in a generic and descriptive sense only and not for purposes of limitation of the scope of the invention being set forth in the following claims.

That which is claimed is:

1. A method of forming an esterification product, said method comprising:

providing (1) at least one component selected from the group consisting of ester monomers, ester oligomers, ester polymers, and mixtures thereof, and (2) a catalyst selected from the group consisting of:

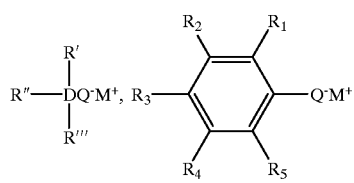

and mixtures thereof;

wherein D is selected from the group consisting of carbon and silicon; Q is selected from the group consisting of O, S, and NR; M is selected from the group consisting of sodium, lithium, potassium, rubidium, and cesium; R, $R_1$, $R_2$, $R_3$, $R_4$, $R_5$, R', R", and R''' are independently selected from the group consisting of H, O, halogen, Si, N, S, P, $C_1$ to $C_{20}$ linear or branched alkyl, $C_3$ to $C_{10}$ cycloalkyl, and aromatic; and reacting said material in the presence of said catalyst to form an esterification product which is a polymer, wherein said esterification product is formed from at least one component selected from the group consisting of ester monomers, ester oligomers, ester polymers, and mixtures thereof;

and wherein said reacting step is a transesterification metathesis reaction.

2. The method according to claim 1, wherein the catalyst is of the formula:

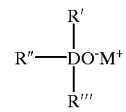

and wherein R', R", and R''' are selected from the group consisting of $C_1$–$C_2$ alkyl.

3. The method according to claim 1, wherein the material is a plurality of ester monomers selected from the group consisting of ethylene glycol diacetate, propylene glycol diacetate, dimethylterephthalate, dimethyladipate, hexanedioldiacetate, dimethylcarbonate, Bisphenol A acetate, Biphenol diacetate, acetoxy glycolic acid methyl ester, dimethylnaphthalate, Bisphenol A acetate, Biphenol diacetate, acetoxy glycolic acid methyl ester, bisphenol-A diacetate, diphenyl carbonate, diphenyl ester of terephthalic acid, bisphenyl ester of isophthalic acid, bisphenyl carbonate of bisphenol-A, bismethyl carbonate of bisphenol-A, and mixtures thereof.

4. The method according to claim 1, wherein said step of reacting the material occurs in the presence of an organic solvent.

5. The method according to claim 1, wherein said step of reacting the material occurs in a gas phase.

6. The method according to claim 1, wherein said step of reacting the material occurs in a supercritical phase.

7. The method according to claim 1, wherein said step of reacting the material occurs in a liquid phase.

8. The method according to claim 4, wherein said step of reacting the material in the presence of an organic solvent occurs at a pressure from about 0 psig to about 10,000 psig.

9. The method according to claim 1, wherein said esterification product is selected from the group consisting of a polyester, a polycarbonate, and mixtures thereof.

10. The method according to claim 1, wherein said esterification product is an esterified pharmaceutical material.

11. The method according to claim 1, wherein said step of reacting the material occurs in the presence of a ligand.

12. A method of decomposing an esterification product, said method comprising:

providing an esterification product which is a polymer and a catalyst selected from the group consisting of:

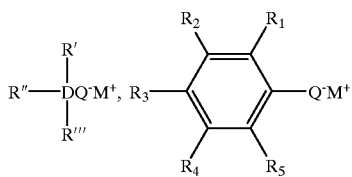

and mixtures thereof;
wherein D is selected from the group consisting of carbon and silicon; Q is selected from the group consisting of O, S, and NR; M is selected from the group consisting of sodium, lithium, potassium, rubidium, and cesium; R, $R_1$, $R_2$, $R_3$, $R_4$, $R_5$, R', R", and R''' are independently selected from the group consisting of H, O, halogen, Si, N, S, P, $C_1$ to $C_{20}$ linear or branched alkyl, $C_3$ to $C_{10}$ cycloalkyl, and aromatic; and reacting said esterification product material in the presence of said catalyst to decompose said esterification product and form at least one ester-containing material selected from the group consisting of ester monomers, ester oligomers, ester polymers and mixtures thereof, wherein said reacting step is a transesterification metathesis reaction.

13. The method according to claim 12, wherein the catalyst is of the formula:

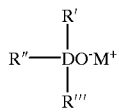

wherein R', R", and R''' are selected from the group consisting of $C_1$–$C_2$ alkyl.

14. The method according to claim 12, wherein the ester-containing material is a plurality of ester monomers selected from the group consisting of ethylene glycol diacetate, propylene glycol diacetate, dimethylterephthalate, dimethyladipate, hexanedioldiacetate, dimethylcarbonate, Bisphenol A acetate, Biphenol diacetate, acetoxy glycolic acid methyl ester, dimethylnaphthalate, bisphenol-A diacetate, diphenyl carbonate, diphenyl ester of terephthalic acid, bisphenyl ester of isophthalic acid, bisphenyl carbonate of bisphenol-A, bismethyl carbonate of bisphenol-A, and mixtures thereof.

15. The method according to claim 12, wherein said step of reacting the esterification product with a catalyst occurs in the presence of an organic solvent.

16. The method according to claim 15, wherein said step of reacting the esterification product in the presence of an organic solvent occurs at a pressure from about 0 psig to about 10,000 psig.

17. The method according to claim 12, wherein said esterification product is selected from the group consisting of a polyester, a polycarbonate, and mixtures thereof.

18. The method according to claim 12, wherein said esterification product is selected from the group consisting of phosphorous-based esters, thioesters, esterified pharmaceutical material, and mixtures thereof.

19. The method according to claim 12, wherein said step of reacting the esterification product in the presence of a catalyst occurs in the presence of a ligand.

20. A method of forming an esterification product, said method comprising:
providing (1) at least one component selected from the group consisting of ester monomers, ester oligomers, ester polymers, and mixtures thereof, and (2) a catalyst selected from the group consisting of:

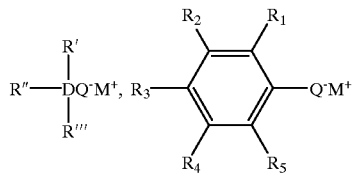

and mixtures thereof;
wherein D is selected from the group consisting of carbon and silicon; Q is selected from the group consisting of O, S, and NR; M is selected from the group consisting of sodium, lithium, potassium, rubidium, and cesium; R, $R_1$, $R_2$, $R_3$, $R_4$, $R_5$, R', R", and R''' are independently selected from the group consisting of H, O, halogen, Si, N, S, P, $C_1$ to $C_{20}$ linear or branched alkyl, $C_3$ to $C_{10}$ cycloalkyl, and aromatic; and reacting said material in the presence of said catalyst to form an esterification product from at least one component selected from the group consisting of ester monomers, ester oligomers, ester polymers, and mixtures thereof, wherein said esterification product which is a polymer selected from the group consisting of a thioester, a phosphorous-based ester, and combinations thereof;

and wherein said reacting step is a transesterification metathesis reaction.

21. The method according to claim 20, wherein the catalyst is of the formula:

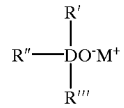

and wherein R', R", and R''' are selected from the group consisting of $C_1$–$C_2$ alkyl.

22. The method according to claim 20, wherein the material is a plurality of ester monomers selected from the group consisting of ethylene glycol diacetate, propylene glycol diacetate, dimethylterephthalate, dimethyladipate, hexanedioldiacetate, dimethylcarbonate, diphenylcarbonate, Bisphenol A acetate, Biphenol diacetate, acetoxy glycolic acid methyl ester, dimethyinaphthalate, Bisphenol A acetate, Biphenol diacetate, acetoxy glycolic acid methyl ester, dimethyinaphthalate bisphenol-A diacetate, diphenyl carbonate, diphenyl ester of terephthalic acid, bisphenyl ester of isophthalic acid, bisphenyl carbonate of bisphenol-A, bismethyl carbonate of bisphenol-A, and mixtures thereof.

23. The method according to claim 20, wherein said step of reacting the material occurs in the presence of an organic solvent.

24. The method according to claim 20, wherein said step of reacting the material occurs in a gas phase.

25. The method according to claim 20, wherein said step of reacting the material occurs in a supercritical phase.

26. The method according to claim 20, wherein said step of reacting the material occurs in a liquid phase.

27. The method according to claim 23, wherein said step of reacting the material in the presence of an organic solvent occurs at a pressure from about 0 psig to about 10,000 psig.

28. The method according to claim 20, wherein said esterification product is present in a pharmaceutical material.

29. The method according to claim 20, wherein said esterification product is a thioester.

30. The method according to claim 20, wherein said esterification product is a phosphorous-based ester.

31. A method of decomposing an esterification product, said method comprising:

providing an esterification product which is a polymer selected from the group consisting of a thioester, a phosphorous-based ester, and mixtures thereof and a catalyst selected from the group consisting of:

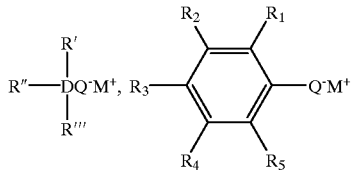

and mixtures thereof;

wherein D is selected from the group consisting of carbon and silicon; Q is selected from the group consisting of O, S, and NR; M is selected from the group consisting of sodium, lithium, potassium, rubidium, and cesium; $R, R_1, R_2, R_3, R_4, R_5, R', R'',$ and $R'''$ are independently selected from the group consisting of H, O, halogen, Si, N, S, P, $C_1$ to $C_{20}$ linear or branched alkyl, $C_3$ to $C_{10}$ cycloalkyl, and aromatic; and reacting said esterification product material in the presence of said catalyst to decompose said esterification product and form at least one ester-containing material selected from the group consisting of ester monomers, ester oligomers, ester polymers and mixtures thereof, wherein said reacting step is a transesterification metathesis reaction.

32. The method according to claim 31, wherein said step of reacting the esterification product with a catalyst occurs in the presence of an organic solvent.

33. The method according to claim 32, wherein said step of reacting the esterification product in the presence of an organic solvent occurs at pressure from about 0 psig to about 10,000 psig.

34. The method according to claim 31, wherein said step of reacting the esterification product in the presence of a catalyst occurs in the presence of a ligand.

* * * * *